US012364287B2

(12) United States Patent
Mironov et al.

(10) Patent No.: US 12,364,287 B2
(45) Date of Patent: Jul. 22, 2025

(54) AEROSOL-GENERATING ARTICLE HAVING A COVER LAYER

(71) Applicant: Altria Client Services LLC, Richmond, VA (US)

(72) Inventors: Oleg Mironov, Cudrefin (CH); Stephane Antony Hedarchet, Pully (CH); Ihar Nikolaevich Zinovik, Peseux (CH); Rui Nuno Batista, Morges (CH); Keethan Dasnavis Fernando, Neuchatel (CH)

(73) Assignee: Altria Client Services LLC, Richmond, VA (US)

( * ) Notice: Subject to any disclaimer, the term of this patent is extended or adjusted under 35 U.S.C. 154(b) by 251 days.

(21) Appl. No.: 18/164,843

(22) Filed: Feb. 6, 2023

(65) Prior Publication Data

US 2023/0180847 A1 Jun. 15, 2023

Related U.S. Application Data

(63) Continuation of application No. 15/586,371, filed on May 4, 2017, now Pat. No. 11,571,025.

(30) Foreign Application Priority Data

May 4, 2016 (EP) .................................... 16168308

(51) Int. Cl.

| | |
|---|---|
| ***A24D 1/20*** | (2020.01) |
| ***A24F 40/50*** | (2020.01) |
| ***H05B 1/02*** | (2006.01) |
| *A24F 40/10* | (2020.01) |

(52) U.S. Cl.

CPC ................ *A24F 40/50* (2020.01); *A24D 1/20* (2020.01); *H05B 1/0244* (2013.01); *A24F 40/10* (2020.01); *H05B 2203/021* (2013.01)

(58) Field of Classification Search

None

See application file for complete search history.

(56) References Cited

U.S. PATENT DOCUMENTS

| | | | | |
|---|---|---|---|---|
| 5,035,731 | A * | 7/1991 | Spruill | B65D 81/24 426/118 |
| 7,163,014 | B2 | 1/2007 | Nichols et al. | |
| 8,991,402 | B2 | 3/2015 | Bowen et al. | |
| 2014/0060554 | A1 | 3/2014 | Collett et al. | |

(Continued)

FOREIGN PATENT DOCUMENTS

| | | | |
|---|---|---|---|
| EP | 2308522 | A2 | 4/2011 |
| WO | WO-2016/005533 | A1 | 1/2016 |

OTHER PUBLICATIONS

Extended European Search Report for European Application No. 16168308.1 Dated Nov. 24, 2016.

*Primary Examiner* — Eric Yaary

(74) *Attorney, Agent, or Firm* — Harness, Dickey & Pierce, P.L.C.

(57) ABSTRACT

An aerosol-generating article may include a base layer, at least one aerosol-forming substrate positioned on the base layer, and a cover layer overlying the at least one aerosol-forming substrate and secured to the base layer so that the at least one aerosol-forming substrate is sealed between the base layer and the cover layer. The cover layer includes a polymeric film comprising at least one of a plurality of micropores and a plurality of microperforations.

13 Claims, 2 Drawing Sheets

(56) References Cited

U.S. PATENT DOCUMENTS

| | | | | |
|---|---|---|---|---|
| 2015/0223523 | A1* | 8/2015 | McCullough .......... | A61K 36/38 131/328 |
| 2016/0262454 | A1* | 9/2016 | Sears ................... | A61M 11/042 |
| 2017/0095000 | A1* | 4/2017 | Spirito .................... | A24F 40/70 |
| 2017/0108210 | A1 | 4/2017 | Meinhart et al. | |

* cited by examiner

AEROSOL-GENERATING ARTICLE HAVING A COVER LAYER

CROSS-REFERENCE TO RELATED APPLICATIONS

This application claims priority to U.S. application Ser. No. 15/586,371, filed May 4, 2017, which claims priority to EP 16168308.1, filed on May 4, 2016, the disclosures of which are hereby incorporated by reference in their entirety.

BACKGROUND

Field

The present disclosure relates to an aerosol-generating article comprising a cover layer comprising at least one of micropores and microperforations. The present disclosure also relates to an aerosol-generating system comprising the aerosol-generating article.

Description of Related Art

One type of aerosol-generating system is an electrically-operated smoking system. Known handheld electrically-operated smoking systems typically comprise an aerosol-generating device comprising a battery, control electronics, and an electric heater for heating an aerosol-generating article designed specifically for use with the aerosol-generating device. In some examples, the aerosol-generating article comprises an aerosol-forming substrate, such as a tobacco rod or a tobacco plug, and the heater contained within the aerosol-generating device is inserted into or around the aerosol-generating substrate when the aerosol-generating article is inserted into the aerosol-generating device. In an alternative electrically-operated smoking system, the aerosol-generating article may comprise a capsule containing an aerosol-generating substrate, such as loose tobacco.

To prevent loss of one or more volatile compounds from the aerosol-forming substrate, aerosol-generating articles may be sealed until use with the aerosol-generating device. However, sealing of aerosol-generating articles may present further problems relating to the use of the aerosol-generating article. For example, known aerosol-generating articles comprising removable seals require the disposal of the seal prior to using the article. Aerosol-generating articles comprising one or more seals that are ruptured prior to use of the article require an aerosol-generating device having a rupturing member, which adds further complexity to the design of the aerosol-generating device.

SUMMARY

According to some example embodiments, there is provided an aerosol-generating article comprising a base layer, at least one aerosol-forming substrate positioned on the base layer, and a cover layer overlying the at least one aerosol-forming substrate and sealed to the base layer so that the at least one aerosol-forming substrate is sealed between the base layer and the cover layer. The cover layer comprises a polymeric film, the polymeric film comprising at least one of a plurality of micropores and a plurality of microperforations.

As used herein, the term 'aerosol-forming substrate' is used to describe a substrate capable of releasing volatile compounds, which can form an aerosol. The aerosols generated from aerosol-forming substrates of aerosol-generating articles may be visible or invisible and may include vapours (for example, fine particles of substances, which are in a gaseous state, that are ordinarily liquid or solid at room temperature) as well as gases and liquid droplets of condensed vapours.

As used herein, the term 'pore' is used to describe an inherent opening in the structure of the material forming the polymeric film. That is, a pore is an opening formed naturally when the polymeric material is formed.

As used herein, the term 'perforation' is used to describe an opening in the polymeric film that has been created after the polymeric film has been formed.

Providing at least one of a plurality of micropores and a plurality of microperforations in the polymeric film forming the cover layer provides the cover layer with a temperature-dependent permeability. As taught herein, the microporous or microperforated polymeric film exhibits a switchable permeability. At room temperature the micropores and the microperforations may be sized so that the cover layer is substantially impermeable with respect to one or more volatile compounds in the at least one aerosol-forming substrate. When the aerosol-generating article is heated to an operating temperature, using an aerosol-generating device, for example, the increased temperature of the cover layer results in the size of the micropores and the microperforations increasing. At the increased size, the micropores and the microperforations becomes permeable to one or more volatile compounds in the at least one aerosol-forming substrate. Therefore, the cover layer does not need to be removed or ruptured prior to use of the article.

The polymeric material may be a microporous polymeric material. In an example embodiment, the micropores have a number average diameter of less than about 2 nanometres at a temperature of 25 degrees Celsius. Micropores having a number average diameter of less than about 2 nanometres may facilitate the desired temperature dependence of the cover layer permeability. A desired porosity can be obtained by controlling one or more process parameters during production of the polymeric material using known processes.

The polymeric material may comprise a plurality of microperforations. In an example embodiment, the microperforations have a number average diameter of less than about 100 micrometres at a temperature of 25 degrees Celsius. For instance, at a temperature of 25 degrees Celsius, the number average diameter may be less than about 75 micrometres (e.g., about 50 micrometres or less). Microperforations having a number average diameter of less than about 100 micrometres may facilitate the desired temperature dependence of the cover layer permeability. Microperforations may be formed in the polymeric material using a known process, such as electro perforation or laser perforation.

The polymeric film may be formed from a material that exhibits a reversible increase in the size of the micropores and the microperforations when the aerosol-generating article is heated to an operating temperature. A cover layer formed from a polymeric film exhibiting a reversible increase in the size of the micropores and the microperforations may reseal itself when the source of heat is removed and the aerosol-generating article cools to room temperature. For instance, when the cover layer cools back to room temperature, the micropores and the microperforations may decrease in size so that the cover layer becomes substantially impermeable to one or more volatile compounds in the at least one aerosol-forming substrate. This may facilitate partial use of the at least one aerosol-forming substrate over a first time period and use of the remaining at least one aerosol-forming substrate over a second, later time period.

The polymeric film may comprise at least one of polypropylene, polyethylene, polytetrafluoroethylene, and combinations thereof.

Forming the cover layer from a polymeric film comprising one or more such materials may optimise the temperature dependence of the cover layer permeability. In particular, using such materials may facilitate forming a cover layer that is substantially impermeable at room temperature, but comprises a permeability providing a desired gas flow rate through the cover layer when heated to an operating temperature of the aerosol-generating article.

Forming the cover layer from a polymeric film comprising one or more such materials may facilitate providing the cover layer with at least one of a desired thermal resistance, chemical resistance, hydrophobicity, oleophobicity, and colour.

The base layer and the at least one aerosol-forming substrate may be in contact with each other at a substantially planar contact surface. Providing the at least one aerosol-forming substrate on a substantially planar portion of the base layer may simplify the manufacture of the aerosol-generating article.

As used herein, the term "substantially planar", means arranged substantially along a single plane.

The cover layer may be secured or sealed to the base layer at a substantially planar contact surface. Sealing the cover layer to a substantially planar portion of the base layer may simplify the manufacture of the aerosol-generating article. The cover layer may be sealed to the base layer around a periphery of the base layer.

The base layer may have any suitable cross-sectional shape. In an example embodiment, the base layer has a non-circular cross-sectional shape. The base layer may have a substantially rectangular cross-sectional shape. The base layer may have an elongate, substantially rectangular, parallelepiped shape. The base layer may be substantially flat. The base layer may be substantially planar. A substantially planar base layer may be particularly suited to aerosol-generating articles comprising at least one solid aerosol-forming substrate.

The base layer may comprise a polymeric foil. The polymeric foil may comprise any suitable material, such as, but not limited to, one or more of a Polyimide (PI), a Polyaryletherketone (PAEK), such as Polyether Ether Ketone (PEEK), Poly Ether Ketone (PEK), or Polyetherketoneetherketoneketone (PEKEKK), or a Fluoric polymer, such as Polytetrafluoroethylene (PTFE), Polyvinylidene Fluoride (PVDF), Ethylene tetrafluoroethylene (ETFE), PVDFELS, or Fluorinated Ethylene Propylene (FEP). The base layer may be formed by injection moulding of a polymeric material, such as, but not limited to, one or more of a Polyaryletherketone (PAEK), such as Polyether Ether Ketone (PEEK), Poly Ether Ketone (PEK), or Polyetherketoneetherketoneketone (PEKEKK), a Polyphenylensulfide, such as Polypropylene (PP), Polyphenylene sulfide (PPS), or Polychlorotrifluoroethene (PCTFE or PTFCE), a Polyarylsulfone, such as Polysulfone (PSU), Polyphenylsulfone (PPSF or PPSU), Polyethersulfone (PES), or Polyethylenimine (PEI), or a Fluoric polymer, such as Polytetrafluoroethylene (PTFE), Polyvinylidene Fluoride (PVDF), Ethylene tetrafluoroethylene (ETFE), PVDFELS, or Fluorinated Ethylene Propylene (FEP).

The base layer may comprise at least one cavity, wherein the at least one aerosol-forming substrate is positioned within the at least one cavity. A base layer comprising at least one cavity may be particularly suited to aerosol-generating article comprising at least one liquid aerosol-forming substrate. In particular, providing the base layer with at least one cavity may facilitate deposition of the at least one liquid aerosol-forming substrate on the base layer during manufacture of the aerosol-generating article.

The at least one aerosol-forming substrate may be a single aerosol-forming substrate positioned on the based layer.

The at least one aerosol-forming substrate may comprise a plurality of aerosol-forming substrates arranged separately on the base layer. Each of the plurality of aerosol-forming substrates may be substantially the same. At least one of the aerosol-forming substrates may be different to another of the aerosol-forming substrates.

In example embodiments in which the base layer comprises at least one cavity, the at least one cavity may comprise a plurality of cavities, wherein each of the plurality of aerosol-forming substrates is positioned in one of the plurality of cavities.

The at least one aerosol-forming substrate may comprise a porous carrier material and a liquid nicotine source sorbed onto the porous carrier material.

The porous carrier material may have a density of between about 0.1 grams/cubic centimetre and about 0.3 grams/cubic centimetre.

The porous carrier material may have a porosity of between about 15 percent and about 55 percent.

The porous carrier material may comprise one or more of glass, cellulose, ceramic, stainless steel, aluminium, polyethylene (PE), polypropylene, polyethylene terephthalate (PET), poly(cyclohexanedimethylene terephthalate) (PCT), polybutylene terephthalate (PBT), polytetrafluoroethylene (PTFE), expanded polytetrafluoroethylene (ePTFE), and BAREX®.

In an example embodiment, the porous carrier material is chemically inert with respect to the liquid aerosol-forming substrate.

The liquid nicotine source may comprise one or more of nicotine, a nicotine base, a nicotine salt, such as nicotine-HCl, nicotine-bitartrate, or nicotine-ditartrate, or a nicotine derivative.

The nicotine source may comprise natural nicotine or synthetic nicotine.

The nicotine source may comprise pure nicotine, a solution of nicotine in an aqueous or non-aqueous solvent or a liquid tobacco extract.

The nicotine source may comprise an electrolyte forming compound. The electrolyte forming compound may be selected from the group consisting of alkali metal hydroxides, alkali metal oxides, alkali metal salts, alkaline earth metal oxides, alkaline earth metal hydroxides and combinations thereof.

The nicotine source may comprise an electrolyte forming compound selected from the group consisting of potassium hydroxide, sodium hydroxide, lithium oxide, barium oxide, potassium chloride, sodium chloride, sodium carbonate, sodium citrate, ammonium sulfate and combinations thereof.

The nicotine source may comprise an aqueous solution of nicotine, nicotine base, a nicotine salt or a nicotine derivative and an electrolyte forming compound.

The nicotine source may comprise other components including, but not limited to, natural flavours, artificial flavours and antioxidants.

The at least one aerosol-forming substrate may comprise a first aerosol-forming substrate comprising the porous carrier material and the nicotine source sorbed onto the porous carrier material, and a second aerosol-forming substrate comprising a porous carrier material and an acid source sorbed onto the porous carrier material. During use, volatile compounds from the nicotine source and the acid source may react in the gas phase to form an aerosol comprising nicotine salt particles.

The acid source may comprise an organic acid or an inorganic acid. In a non-limiting embodiment, the organic acid may be a carboxylic acid (e.g., an alpha-keto or 2-oxo acid or lactic acid).

In some example embodiments, the acid source comprises an acid selected from the group consisting of 3-methyl-2-oxopentanoic acid, pyruvic acid, 2-oxopentanoic acid, 4-methyl-2-oxopentanoic acid, 3-methyl-2-oxobutanoic acid, 2-oxooctanoic acid, lactic acid and combinations thereof. For instance, the acid source may comprise pyruvic acid or lactic acid. In another instance, the acid source may comprise lactic acid.

The at least one aerosol-forming substrate may comprise a tobacco-containing material provided on the base layer. The at least one aerosol-forming substrate may comprise a solid aerosol-forming substrate. The at least one aerosol-forming substrate may comprise at least one of herb leaf, tobacco leaf, fragments of tobacco ribs, reconstituted tobacco, homogenised tobacco, extruded tobacco and expanded tobacco.

In example embodiments in which the at least one aerosol-forming substrate comprises homogenised tobacco, the homogenised tobacco material may be formed by agglomerating particulate tobacco. The homogenised tobacco material may be in the form of a sheet. The homogenised tobacco material may have an aerosol-former content of greater than 5 percent on a dry weight basis. The homogenised tobacco material may have an aerosol-former content of between 5 percent and 30 percent by weight on a dry weight basis. Sheets of homogenised tobacco material may be formed by agglomerating particulate tobacco obtained by grinding or otherwise comminuting one or both of tobacco leaf lamina and tobacco leaf stems. Sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco. Sheets of homogenised tobacco material may comprise other additives including, but not limited to, tobacco and non-tobacco fibres, aerosol-formers, humectants, plasticisers, flavourants, fillers, aqueous and non-aqueous solvents, and combinations thereof. Sheets of homogenised tobacco material may be formed by a casting process of the type generally comprising casting a slurry comprising particulate tobacco and one or more binders onto a conveyor belt or other support surface, drying the cast slurry to form a sheet of homogenised tobacco material and removing the sheet of homogenised tobacco material from the support surface.

The at least one aerosol-forming substrate may include at least one aerosol-former. Suitable aerosol-formers include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate Suitable aerosol formers are polyhydric alcohols or mixtures thereof, such as propylene glycol, triethylene glycol, 1,3-butanediol, and glycerine.

The at least one aerosol-forming substrate may comprise a single aerosol former. The at least one aerosol-forming substrate may comprise a combination of two or more aerosol formers.

The aerosol-generating article may have any suitable size. The aerosol-generating article may have suitable dimensions for use with a handheld aerosol-generating system. In some example embodiments, the aerosol-generating article has length of from about 5 mm to about 200 mm. For instance, the length may be from about 10 mm to about 100 mm (e.g., from about 20 mm to about 35 mm). In some example embodiments, the aerosol-generating article has a width of from about 5 mm to about 12 mm (e.g., from about 7 mm to about 10 mm). In some example embodiments, the aerosol-generating article has a height of from about 2 mm to about 10 mm (e.g., from about 5 mm to about 8 mm).

The at least one aerosol-forming substrate may be substantially flat. As used herein, the term "substantially flat" means having a thickness to width ratio of at least 1:2 (e.g., from 1:2 to about 1:20). This includes, but is not limited to having a substantially planar shape. Flat components can be easily handled during manufacture and provide for a robust construction. In addition, it has been found that aerosol release from the aerosol-forming substrate is improved when it is substantially flat and when a flow of air is drawn across the width, length, or both, of the aerosol-forming substrate.

The aerosol-generating article may further comprise at least one electric heater. The at least one electric heater is positioned proximate the at least one aerosol-forming substrate for heating the at least one aerosol-forming substrate.

According to some example embodiments, there is provided an aerosol-generating system comprising an aerosol-generating device, at least one electric heater, and an aerosol-generating article in accordance with any of the example embodiments described herein. The aerosol-generating device comprises an electrical power supply and a controller configured to control a supply of electrical power from the electrical power supply to the at least one electric heater.

The aerosol-generating device comprises a cavity for receiving the aerosol-generating article. In an example embodiment, the aerosol-generating device comprises a housing defining the cavity.

The at least one electric heater may form part of the aerosol-generating article, as described herein, such that the at least one electric heater and the aerosol-generating article is an integral structure. The aerosol-generating device may comprise a first set of electrical contacts, and the aerosol-generating article may comprise a second set of electrical contacts arranged to contact the first set of electrical contacts when the aerosol-generating article is combined with the aerosol-generating device. The controller may be configured to control a supply of electrical power from the electrical power supply to the at least one electric heater via the first and second sets of electrical contacts.

The at least one electric heater may be separate from the aerosol-generating device and the aerosol-generating article. In such example embodiments, the aerosol-generating device, the at least one electric heater and the aerosol-generating article are combined to form the aerosol-generating system. In example embodiments in which the aerosol-generating device comprises a cavity, the cavity may be configured to receive both the at least one electric heater and the aerosol-generating article. The aerosol-generating device may comprise a first set of electrical contacts, and the at least one electric heater may comprise a second set of electrical contacts arranged to contact the first set of electrical contacts when the at least one electric heater is combined with the aerosol-generating device. The controller may be configured to control a supply of electrical power from the electrical power supply to the at least one electric heater via the first and second sets of electrical contacts.

The at least one electric heater may form part of the aerosol-generating device such that the at least one electric heater and the aerosol-generating device is an integral structure. In example embodiments in which the aerosol-generating device comprises a cavity for receiving the aerosol-generating article, the at least one electric heater may be positioned within the cavity.

The at least one electric heater may comprise an electrically resistive material. Suitable electrically resistive materials include but are not limited to: electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminium- titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required.

The at least one electric heater may comprise an infra-red heating element, a photonic source, or an inductive heating element.

The at least one electric heater may take any suitable form. The at least one electric heater may take the form of a heating blade. The at least one electric heater may take the form of a casing or substrate having different electro-conductive portions, or an electrically resistive metallic tube. The at least one electric heater may comprise one or more heating needles or rods that run through the centre of the at least one aerosol-forming substrate. The at least one electric heater may be a disk (end) heater or a combination of a disk heater with heating needles or rods. The at least one electric heater may comprise one or more stamped portions of electrically resistive material, such as stainless steel. The at least one electric heater may comprise a heating wire or filament, for example a Ni—Cr (Nickel-Chromium), platinum, tungsten or alloy wire or a heating plate.

The at least one electric heater may comprise a plurality of electrically conductive filaments. The plurality of electrically conductive filaments may form a mesh or array of filaments or may comprise a woven or non-woven fabric.

The electrically conductive filaments may define interstices between the filaments and the interstices may have a width of between 10 micrometres and 100 micrometres. The filaments may give rise to capillary action in the interstices, so that in use, liquid to be vaporised is drawn into the interstices, increasing the contact area between the heater assembly and the liquid. The electrically conductive filaments may form a mesh of size between 160 and 600 Mesh US (+/−10 percent) (i.e., between 160 and 600 filaments per inch (+/−10 percent)). The width of the interstices may be between 25 micrometres and 75 micrometres. The percentage of open area of the mesh, which is the ratio of the area of the interstices to the total area of the mesh, may be between 25 percent and 56 percent. The mesh may be formed using different types of weave or lattice structures. The mesh, array or fabric of electrically conductive filaments may also be characterised by its ability to retain liquid, as is well understood in the art. The electrically conductive filaments may have a diameter of between 10 micrometres and 100 micrometres. For instance, the diameter may be between 8 micrometres and 50 micrometres (e.g., between 8 micrometres and 39 micrometres). The filaments may have a round cross section or may have a flattened cross-section. The heater filaments may be formed by etching a sheet material, such as a foil. This may be beneficial when the heater assembly comprises an array of parallel filaments. If the heater assembly comprises a mesh or fabric of filaments, the filaments may be individually formed and knitted together. The electrically conductive filaments may be provided as a mesh, array or fabric. The area of the mesh, array or fabric of electrically conductive filaments may be relatively small (e.g., less than or equal to 25 square millimetres), allowing it to be incorporated in to a handheld system. The mesh, array or fabric of electrically conductive filaments may, for example, be rectangular and have dimensions of 5 millimetres by 2 millimetres. The mesh or array of electrically conductive filaments may cover an area of between 10 percent and 50 percent of the area of the heater assembly. In a non-limiting embodiment, the mesh or array of electrically conductive filaments covers an area of between 15 percent and 25 percent of the area of the heater assembly.

The at least one electric heater may comprise at least one semiconductor heater. The at least one semiconductor heater may comprise a plurality of semiconductor heaters. Each semiconductor heater may comprise a substrate layer and a heating layer provided on the substrate layer. Each heating layer may be provided on a separate substrate layer. In an example embodiment, the plurality of semiconductor heaters comprises a common substrate layer and a plurality of heating layers spaced apart from each other and each provided on the common substrate layer, wherein each heating layer forms a semiconductor heater. Using a common substrate layer may simplify the manufacture of the plurality of semiconductor heaters and the aerosol-generating device. A suitable material for forming the substrate layer is silicon. The substrate layer may be a silicon wafer.

Each heating layer may comprise polycrystalline silicon. Each heating layer may comprise one or more dopants to provide the polycrystalline silicon with a desired electrical resistance. A suitable dopant is phosphorous. Each heating layer may be a substantially continuous layer. Each heating layer may form a pattern on the substrate layer. Providing a heating layer that forms a pattern on the substrate layer may provide a desired temperature distribution across the semiconductor heater during operation of the heater.

The electrical power supply may comprise a direct current (DC) source. In some example embodiments, the electrical power supply comprises a battery. The electrical power supply may comprise a Nickel-metal hydride battery, a Nickel cadmium battery, or a Lithium based battery, for example a Lithium-Cobalt, a Lithium-Iron-Phosphate or a Lithium-Polymer battery.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
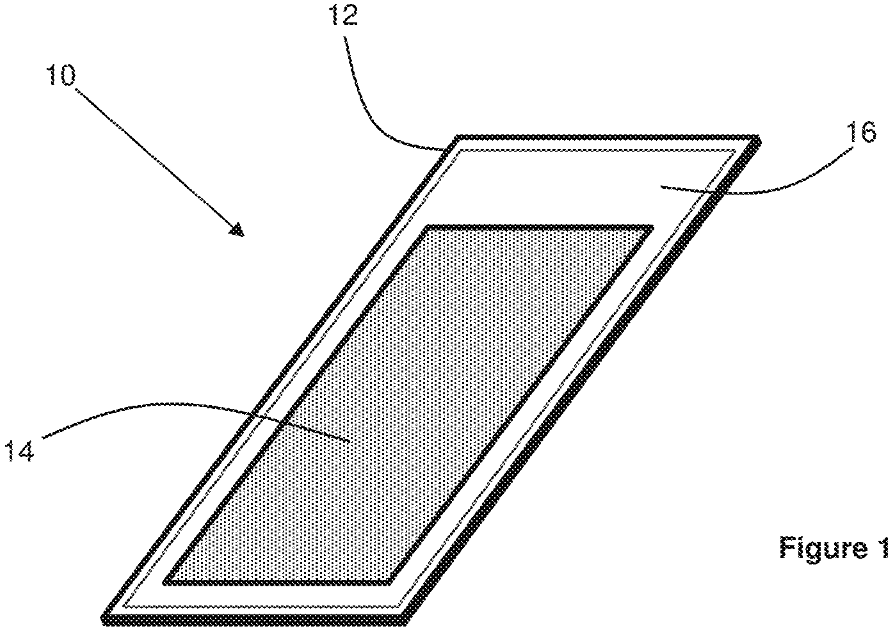
FIG. 1 shows a perspective view of an aerosol-generating article according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 shows an aerosol-generating article 10 according to an example embodiment. The aerosol-generating article 10 comprises a base layer 12 and an aerosol-forming substrate 14 provided on the base layer 12. The aerosol-forming substrate 14 comprises a substantially continuous layer of a solid tobacco-containing material. A cover layer 16 is secured to the base layer 12 to seal the aerosol-forming substrate 14 between the base layer 12 and the cover layer 16. The cover layer 16 is formed from a microperforated polymeric film.

Prior to use, the microperforated polymeric film forming the cover layer 16 is substantially impermeable to one or more volatile compounds in the aerosol-forming substrate 14. Therefore, prior to use, the one or more volatile compounds are sealed between the base layer 12 and the cover layer 16.

During use, the aerosol-generating article 10 is heated so that the size of the microperforations in the polymeric film increases. The increased size of the microperforations when the aerosol-generating article is heated results in the cover layer 16 becoming permeable to one or more volatile compounds in the aerosol-forming substrate 14. Therefore, when the aerosol-generating article 10 is heated, one or more volatile compounds are released from the aerosol-forming substrate 14 through the cover layer 16.

Instead of a microperforated cover layer 16, the cover layer may be formed from a microporous polymeric film, wherein the micropores provide the same temperature dependent permeability as the micrperforations. Alternatively, the cover layer 16 may be formed from a polymeric material comprising both micropores and microperforations.

Figure 2:
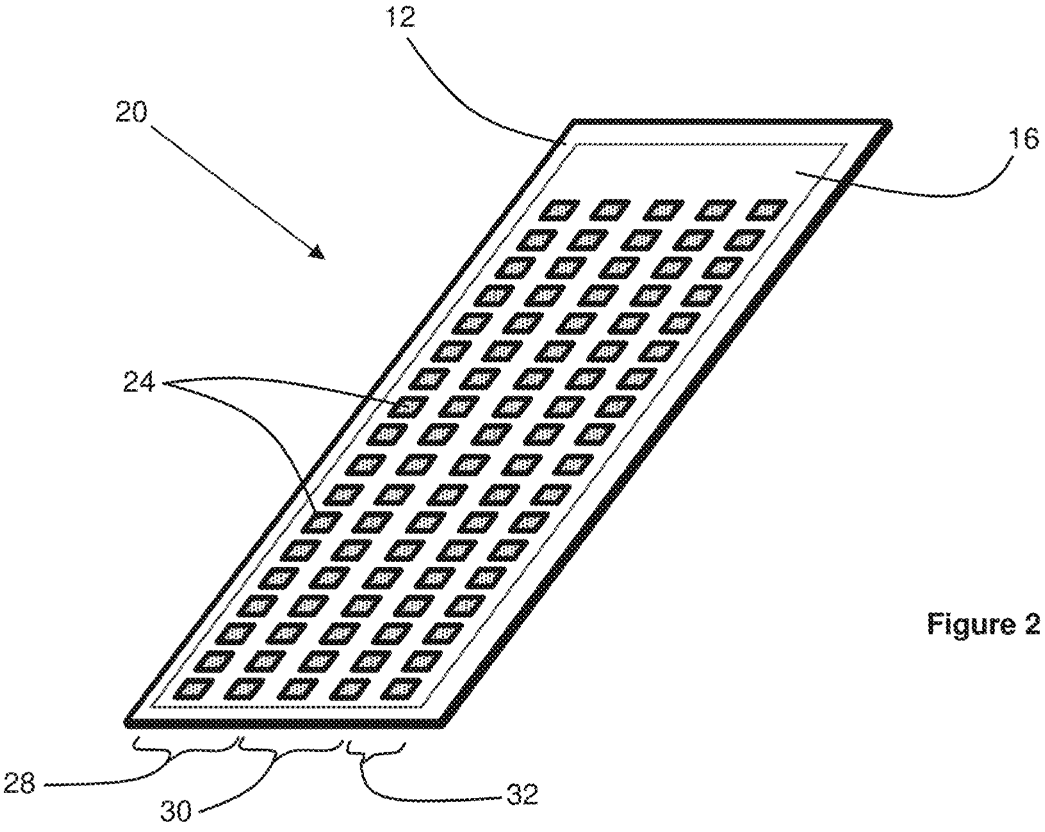
FIG. 2 shows a perspective view of an aerosol-generating article according to another example embodiment.

FIG. 2 shows an aerosol-generating article 20 according to an example embodiment. The aerosol-generating article 20 comprises a base layer 12 and a cover layer 16 identical to the base layer 12 and the cover layer 16 of the aerosol-generating article 10 shown in FIG. 1. In particular, the function of the cover layer 16 when at room temperature and when heated is the same as the cover layer 16 described with reference to FIG. 1.

The aerosol-generating article 20 comprises a plurality of discrete aerosol-forming substrates 24 positioned on the base layer 12 and sealed between the base layer 12 and the cover layer 16. Each of the aerosol-forming substrates 24 comprises a porous carrier material and a liquid aerosol-forming substrate sorbed onto the porous carrier material.

The plurality of aerosol-forming substrates 24 is divided into three groups: a plurality of first aerosol-forming substrates 28 each comprising a liquid nicotine solution; a plurality of second aerosol-forming substrates 30 each comprising a volatile acid; and a plurality of third aerosol-forming substrates 32 each comprising a flavourant.

Figure 3:
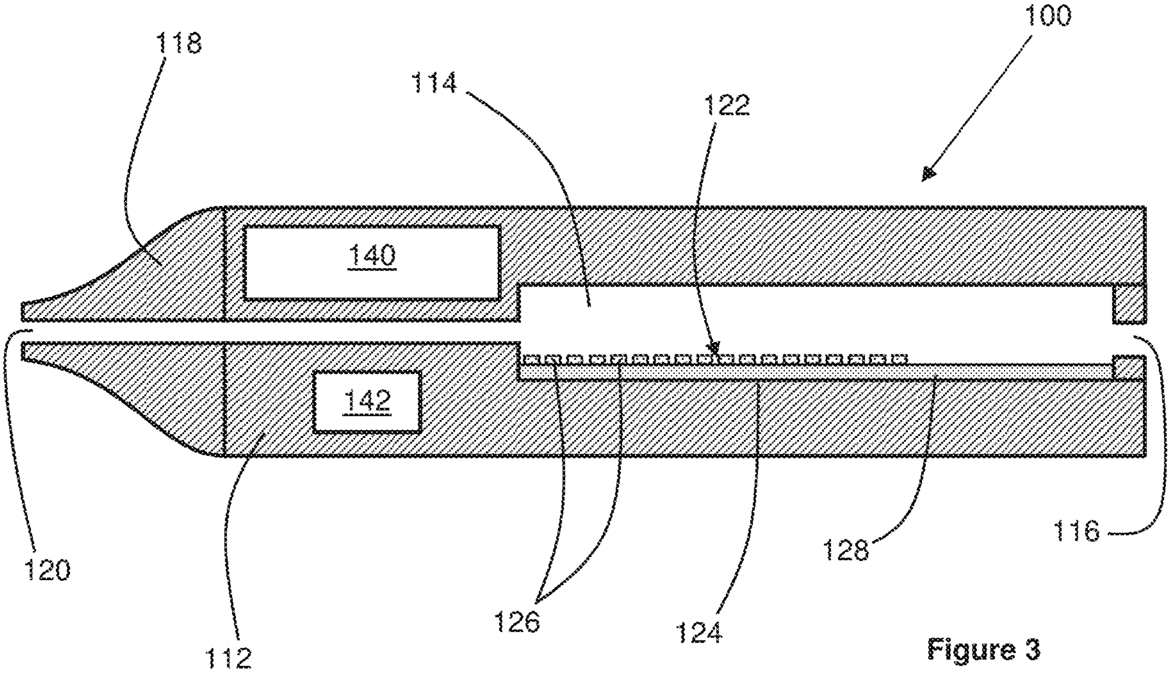
FIG. 3 shows a cross-sectional view of an aerosol-generating device for use with aerosol-generating articles according to an example embodiment.

FIG. 3 shows a cross-sectional view of an aerosol-generating device 100 for use with the aerosol-generating articles according to an example embodiment. The aerosol-generating device 100 comprises a housing 112 defining a cavity 114 for receiving an aerosol-generating article. An air inlet 116 is provided at an upstream end of the cavity 114 and a mouthpiece 118 is provided at a downstream end of the housing 112. An air outlet 120 is provided in the mouthpiece 118 in fluidic communication with the cavity 114 so that an airflow path is defined through the cavity 114 between the air inlet 116 and the air outlet 120. During use, a negative pressure may be applied to the mouthpiece 118 to draw air into the cavity 114 through the air inlet 116 and out of the cavity 114 through the air outlet 120.

The aerosol-generating device 100 further comprises a plurality of electric heaters 122 provided on a planar wall 124 of the cavity 114. Each of the electric heaters 122 comprises a heater element 126 provided on a common support layer 128.

The aerosol-generating device 100 further comprises an electrical power supply 140 and a controller 142 positioned within the housing 112. During operation of the aerosol-generating device 100, the controller 142 controls a supply of electrical current from the electrical power supply 140 to each electric heater 122 to activate the each electric heater 122. The controller 142 may be configured to activate the plurality of electric heaters 122 in groups, with each group being activated and deactivated sequentially.

Figure 4:
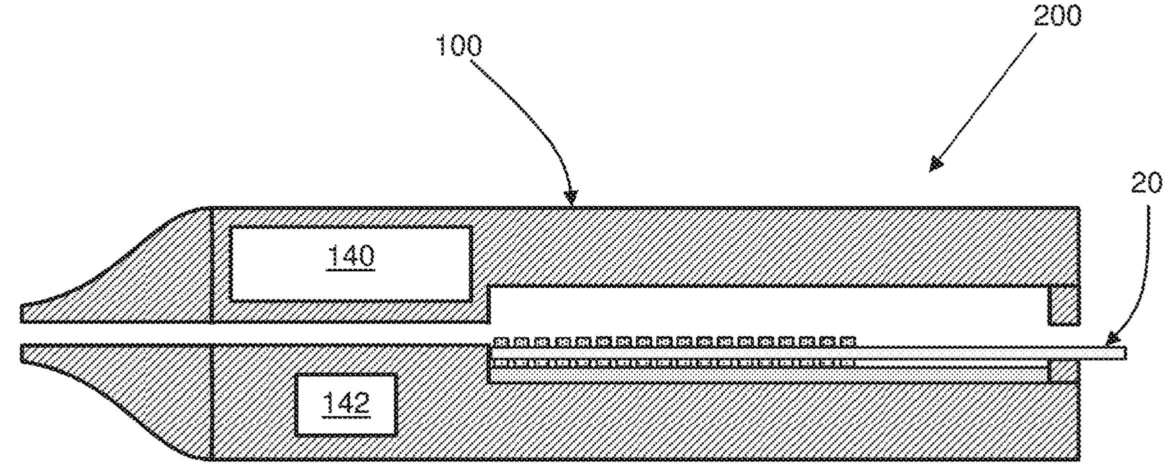
FIG. 4 shows a cross-sectional view of the aerosol-generating article of FIG. 2 combined with the aerosol-generating device of FIG. 3 to form an aerosol-generating system.

FIG. 4 shows the aerosol-generating article 20 of FIG. 2 combined with the aerosol-generating device 100 of FIG. 3 to form an aerosol-generating system 200. During use, the aerosol-generating article 20 is inserted into the cavity 114 of the aerosol-generating device 100. The arrangement of the aerosol-forming substrates 24 is such that each aerosol-forming substrate 24 overlies an electric heater 122 when the aerosol-generating article 20 is received within the cavity 114.

The controller 142 then sequentially activates and deactivates groups of the electric heaters 122 to sequentially heat the discrete aerosol-forming substrates 24. The heat from each activated electric heater 122 also heats the overlying portion of the cover layer 16 so that the microperforations in the heated portion of the cover layer 16 enlarge and become permeable to one or more volatile compounds in the heated aerosol-forming substrate 24.

At each stage of the sequential activation, the controller 142 activates the appropriate electric heaters 122 to simultaneously heat one of the first aerosol-forming substrates 28, one of the second aerosol-forming substrates 30 and one of the third aerosol-forming substrates 32. The nicotine vapour released from the heated first aerosol-forming substrate 28 and the acid vapour released from the heated second aerosol-forming substrate 30 react in the gas phase to form an aerosol comprising nicotine salt particles for delivery through the air outlet 120. The flavourant released from the heated third aerosol-forming substrate 32 imparts a flavour to the aerosol.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An aerosol-generating article comprising:

a base layer;

at least one aerosol-forming substrate on the base layer; and a cover layer overlying the at least one aerosol-forming substrate such that the at least one aerosol-forming substrate is sealed between the base layer and the cover layer, the cover layer defining at least one of a plurality of micropores and a plurality of microperforations and having a switchable permeability with regard to volatile compounds in the at least one aerosol-forming substrate.

2. The aerosol-generating article according to claim 1, wherein the plurality of micropores have a number average diameter of less than 2 nanometres at a temperature of 25 degree Celsius.

3. The aerosol-generating article according to claim 1, wherein the plurality of microperforations have a number average diameter of less than 100 micrometres at a temperature of 25 degrees Celsius.

4. The aerosol-generating article according to claim 1, wherein the cover layer includes at least one of polypropylene, polyethylene, polytetrafluoroethylene, and combinations thereof.

5. The aerosol-generating article according to claim 1, wherein the base layer and the at least one aerosol-forming substrate are in contact with each other at a substantially planar contact surface.

6. The aerosol-generating article according to claim 1, wherein the base layer defines at least one cavity, and the at least one aerosol-forming substrate is positioned within the at least one cavity.

7. The aerosol-generating article according to claim 1, wherein the at least one aerosol-forming substrate is in a form of a plurality of aerosol-forming substrates arranged separately on the base layer.

8. The aerosol-generating article according claim 7, wherein the base layer defines a plurality of cavities, and each of the plurality of aerosol-forming substrates is positioned in one of the plurality of cavities.

9. The aerosol-generating article according to claim 1, wherein the at least one aerosol-forming substrate includes a first porous carrier material and a nicotine source sorbed onto the first porous carrier material.

10. The aerosol-generating article according to claim 9, wherein the at least one aerosol-forming substrate includes a first aerosol-forming substrate and a second aerosol-forming substrate, the first aerosol-forming substrate including the first porous carrier material and the nicotine source sorbed onto the first porous carrier material, the second aerosol-forming substrate including a second porous carrier material and an acid source sorbed onto the second porous carrier material.

11. The aerosol-generating article according to claim 1, wherein the at least one aerosol-forming substrate includes a tobacco-containing material provided on the base layer.

12. The aerosol-generating article according to claim 1, further comprising:

at least one electric heater.

13. The aerosol-generating article according to claim 12, wherein select ones of the plurality of micropores and the plurality of microperforations are configured to enlarge when exposed to heat generated by the at least one electric heater so as to alter the switchable permeability of the cover layer.

* * * * *